(12) United States Patent
Kirchner et al.

(10) Patent No.: US 9,899,791 B2
(45) Date of Patent: Feb. 20, 2018

(54) SINGLE PASS AMPLIFICATION OF DISSIPATIVE SOLITON-LIKE SEED PULSES

(71) Applicant: KM Labs Inc., Boulder, CO (US)

(72) Inventors: Matthew S. Kirchner, Westminster, CO (US); Sterling Backus, Boulder, CO (US); David Winters, Erie, CO (US)

(73) Assignee: KM Labs Inc., Boulder, CO (US)

( * ) Notice: Subject to any disclaimer, the term of this patent is extended or adjusted under 35 U.S.C. 154(b) by 0 days.

(21) Appl. No.: 15/156,320

(22) Filed: May 16, 2016

(65) Prior Publication Data

US 2017/0025811 A1    Jan. 26, 2017

Related U.S. Application Data

(60) Provisional application No. 62/161,381, filed on May 14, 2015.

(51) Int. Cl.
| | | |
|---|---|---|
| *H01S 3/067* | (2006.01) | |
| *H01S 3/00* | (2006.01) | |
| *H01S 3/094* | (2006.01) | |
| *H01S 3/11* | (2006.01) | |

(52) U.S. Cl.
CPC ........ *H01S 3/06725* (2013.01); *H01S 3/0057* (2013.01); *H01S 3/06758* (2013.01); *H01S 3/0064* (2013.01); *H01S 3/06741* (2013.01); *H01S 3/094003* (2013.01); *H01S 3/1112* (2013.01); *H01S 2301/085* (2013.01)

(58) Field of Classification Search
CPC .......... H01S 3/06725; H01S 3/094038; H01S 3/06758; H01S 3/06716; H01S 2301/085
See application file for complete search history.

(56) References Cited

U.S. PATENT DOCUMENTS

| | | | |
|---|---|---|---|
| 7,733,922 B1* | 6/2010 | Munroe ............... | H01S 3/2316 372/102 |
| 2003/0081892 A1* | 5/2003 | Ghera ................ | H01S 3/06758 385/27 |
| 2005/0226278 A1* | 10/2005 | Gu ....................... | H01S 3/0057 372/6 |
| 2008/0030847 A1* | 2/2008 | Murison ............ | H01S 3/06754 359/341.3 |
| 2008/0089366 A1* | 4/2008 | Liu ....................... | H01S 3/067 372/6 |
| 2009/0046746 A1* | 2/2009 | Munroe ............. | H01S 3/06758 372/6 |
| 2010/0046066 A1* | 2/2010 | Fermann ............. | H01S 3/06754 359/341.5 |
| 2011/0249321 A1* | 10/2011 | Savage-Leuchs ... | H01S 3/06754 359/341.3 |
| 2013/0177031 A1* | 7/2013 | Almeida ............. | H01S 3/06754 372/6 |
| 2015/0139264 A1* | 5/2015 | Zhang .................. | H01S 5/141 372/107 |

* cited by examiner

*Primary Examiner* — Xinning Niu
(74) *Attorney, Agent, or Firm* — Macheledt Bales LLP; Jennifer L. Bales (57) ABSTRACT

A system for single pass amplification of dissipative soliton-like seed pulses of 1-20 ps to produce output pulses of 50-200 fs, without requiring a stretcher. Such an amplifier relies on the inherent chirp of the seed pulse out of the oscillator instead of pulse stretching.

20 Claims, 7 Drawing Sheets

SINGLE PASS AMPLIFICATION OF DISSIPATIVE SOLITON-LIKE SEED PULSES

U.S. Pat. No. 8,416,817 is incorporated herein by reference.

BACKGROUND OF THE INVENTION

Field of the Invention

The present invention relates to apparatus and methods for single pass fiber amplification of dissipative soliton-like seed pulses. In particular, the present invention relates to such amplification of seed pulses of >1 picosecond duration that are subsequently compressed to 50-200 femtosecond output pulses.

Discussion of Related Art

Figure 1A:
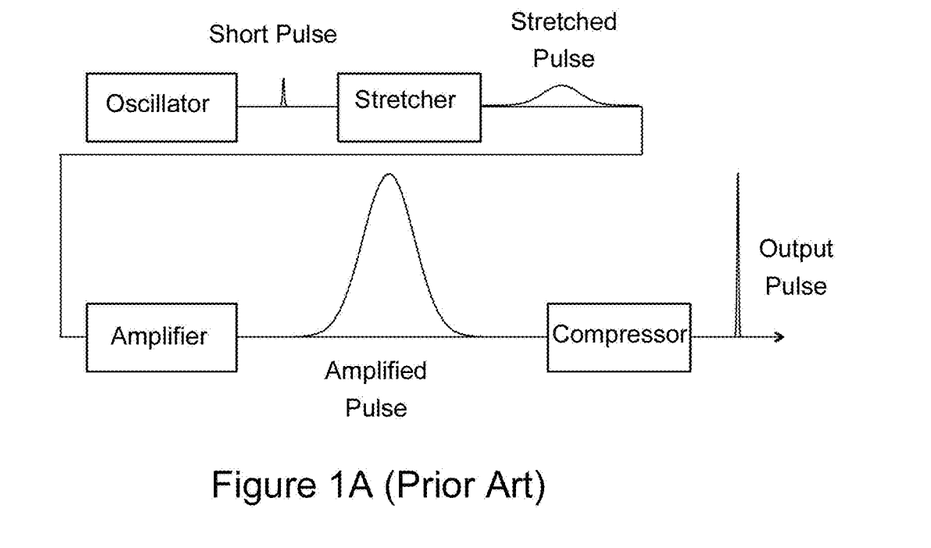
FIG. 1A illustrates Chirped Pulse Amplification.

Standard fiber amplifiers use the scheme of CPA (Chirped Pulse Amplification) where an oscillator pulse is temporally stretched to tens of ps to tens of ns, amplified, and then recompressed. The main goal of CPA is to avoid nonlinear effects, which can reduce the quality of the final compressed pulse (affecting either the shortness of the pulse or the amount of residual energy, "pedestal", not in the main short pulse, or both). Traditional CPA using optical fiber based amplifiers is limited in output pulse duration due to a combination of factors including gain narrowing and high order dispersion effects (all dispersion orders greater than second order dispersion). FIG. 1A (Prior Art) illustrates schematically the stretching, amplification, and subsequent compression of a short pulse. The stretchers and compressors in this case can be comprised either of bulk components or optical fibers.

Figure 1B:
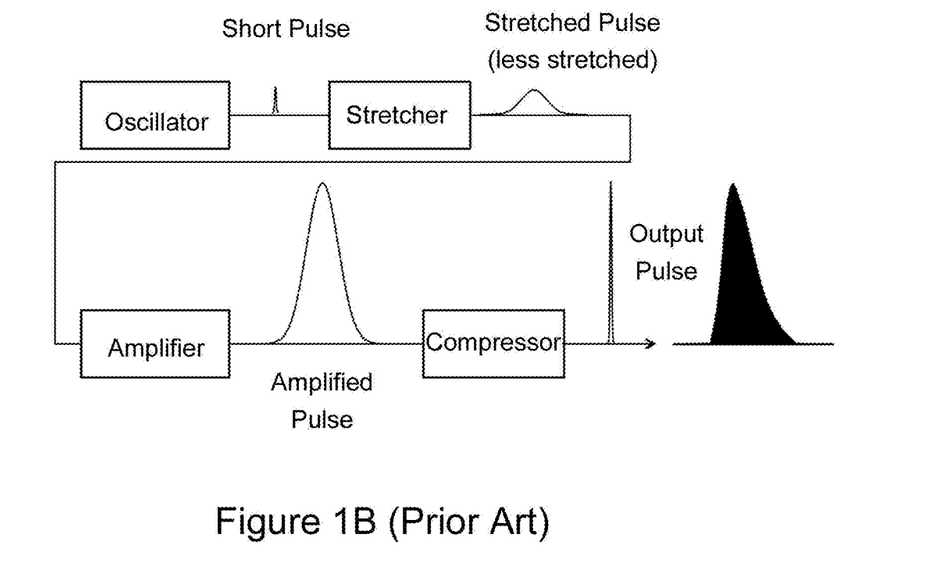
FIG. 1B illustrates cubicon amplification.

More recently, approaches have been shown to utilize a combination of pulse stretching and nonlinear amplifier propagation to partially compensate for residual high order dispersion terms. See, for example U.S. Pat. Nos. 7,414,780, 8,228,597, 8,503,069, and 9,042,004. This approach, also known as "cubicon amplification" is an amplification process that uses nonlinear effects (self-phase modulation, or SPM) on specially-shaped spectra (triangular spectrum also described as a "sharkfin") to compensate for third-order dispersion (TOD) in a mismatched stretcher and compressor. The main advantage of this approach is the ability to use an all-fiber stretcher, which simplifies the amplifier design. This type of amplification supports high-fidelity compression of the output laser pulse even in the presence of high cumulative nonlinear phase shifts in the amplifier corresponding to >1 radian nonlinear phase, improving the obtainable output energy over traditional fiber CPA, which is not robust to nonlinear phase shifts. It can also reduce the pulse duration to <350 fs, shorter than with traditional fiber CPA. FIG. 1B (Prior Art) illustrates cubicon amplification. It is similar in form to CPA in that the pulse is stretched in time, however, in this case the pulse is left short enough to accumulate a desired amount of nonlinear phase. This nonlinear phase at least partially compensates for the (non-compensated) third-order dispersion from the stretcher and compressor. This gives rise to the characteristic "sharkfin" spectral shape which has been indicated schematically.

Figure 1C:
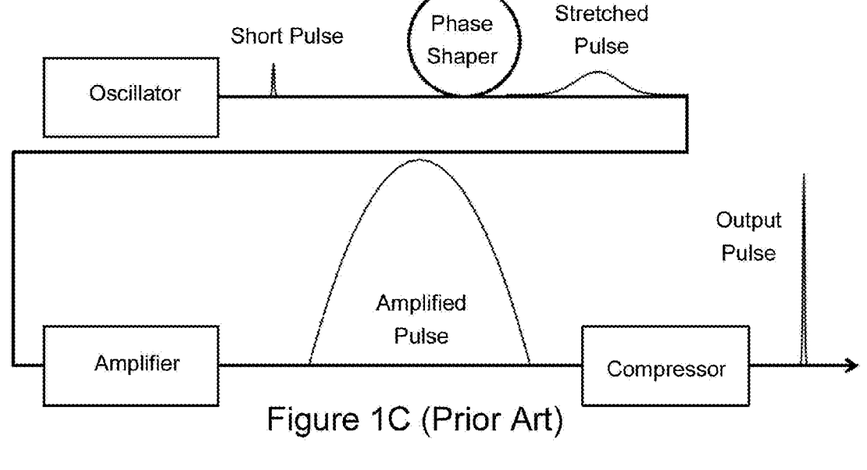
FIG. 1C illustrates parabolic amplification.

Another approach to overcoming the limitations of traditional CPA fiber laser systems is parabolic amplification, also known as self-similar or similariton amplification. Parabolic amplification is a process where a pulse is stretched and spectrally modified to propagate through the amplifying medium while maintaining the temporal shape, but not the pulse duration/spectral width. Generally, the temporal pulse is very well characterized by a parabola, even near the wings of the pulse, while the spectral shape starts narrow and broadens as the pulse amplifies. This is also called self-similar propagation because for many levels of output pulse energy, the output pulse retains a similar shape (parabolic) and the time duration of the output is proportional to the cube root of the pulse energy. Parabolic amplifiers can sustain high levels of nonlinear phase shifts, while maintaining a nearly quadratic phase profile, which makes pulse compression to near the transform limit easier. FIG. 1C (Prior Art) illustrates the process of parabolic pulse ("similariton") amplification. In this process, a short optical pulse is stretched, as in CPA and cubicon, but only to such an extent as to allow the formation of self-similar pulses emerging from the amplifier showing their characteristic parabolic temporal shape.

Figure 1D:
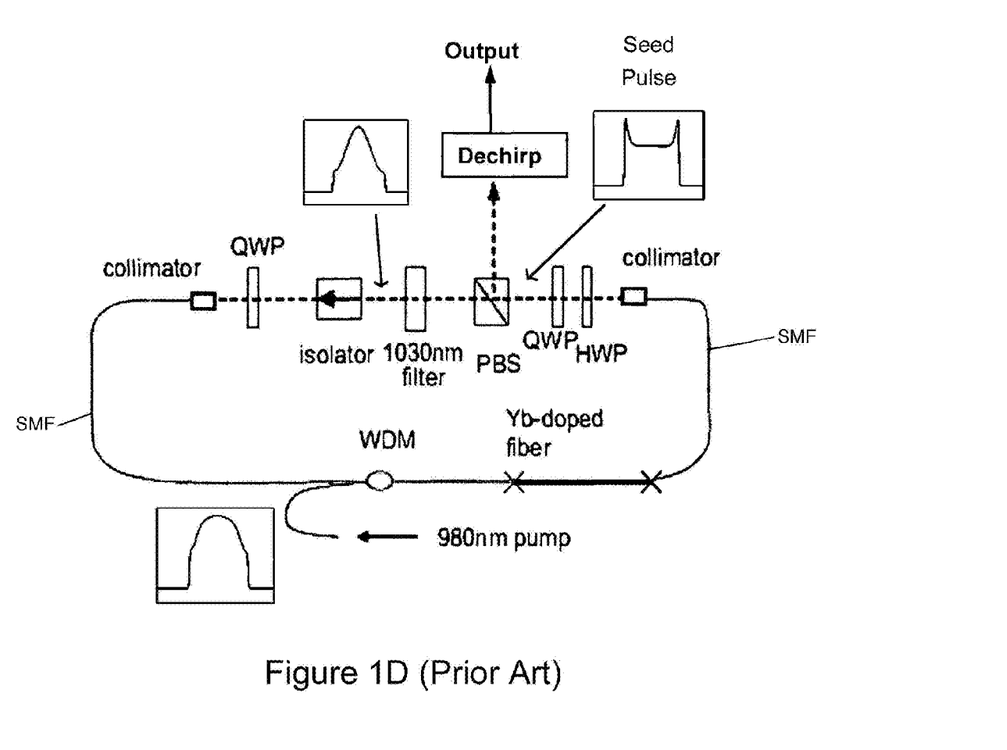
FIG. 1D is a schematic diagram of an ANDi oscillator.

FIG. 1D is a schematic diagram illustrating an All-Normal-Dispersion (ANDi) femtosecond fiber laser. This laser is described in U.S. Pat. No. 8,416,817 (incorporated herein by reference). The ANDi laser produces a "bat ears" shaped output pulse, which is one option for the seed pulse of the present invention.

A need remains in the art for apparatus and methods for single pass amplification of dissipative soliton-like seed pulses with initial and final pulse duration of significantly larger than 1 ps in pulse duration, without requiring a (large footprint) pulse stretcher before amplification, and with output capable of compression using standard (linear) techniques to produce output pulses of 50-200 fs, or in some case 300 fs.

SUMMARY OF THE INVENTION

It is an object of the present invention to provide apparatus and methods for generation of high-energy (>1 µJ) ultrafast laser pulses through an oscillator-amplifier configuration employing single pass amplification of dissipative soliton-like seed pulses of 1-20 ps to produce output pulses of 50-200 fs, in a compact configuration with a minimum of free-space components. Such system ideally makes use of a mode-locked "oscillator" seed laser that generates pulses that are inherently chirped, avoiding the need for a pulse stretcher before the amplifier.

An embodiment of an amplifier according to the present invention is fed with a seed pulse train with the pulses having a pulse duration in excess of 1 ps. The oscillator is tuned to produce a pulse appropriate for amplification, having a typical spectral width of 8 nm near 1040 nm wavelength, emerging from the model-locked oscillator with a spectral phase "chirp" sufficient to stretch the pulse to 10 ps duration. The bat ears shaped pulse produced by an ANDi laser is ideal.

The pulse train is then directed into one or more fiber amplifiers via a pump combiner that combines pump light and seed light into a first gain fiber, which is doped with rare earth ions with one core size and doping level, and amplifies the seed pulses by a factor of 10-1000. The majority of the pump light is transmitted to the second gain fiber. The gain fibers can include single mode (SM) fiber, large mode area (LMA) fiber, or photonic crystal fiber (PCF), and can be single or double clad.

The seed source may comprise an oscillator configured to produce appropriate shaped seed pulses directly, such as an ANDi oscillator, or may comprise a conventional oscillator and a phase conditioning stage, which could consist of an optical fiber, grating pair, or other dispersive element to control the phase and achieve the desired phase. Other potential elements could include a spectral filter, a pulse picker, etc. A compressor then generates compressed output pulses.

BRIEF DESCRIPTION OF THE DRAWINGS

FIGS. 1A-1D (Prior Art) illustrate prior art approaches to fiber amplification.

DETAILED DESCRIPTION OF THE INVENTION

Figure 2:
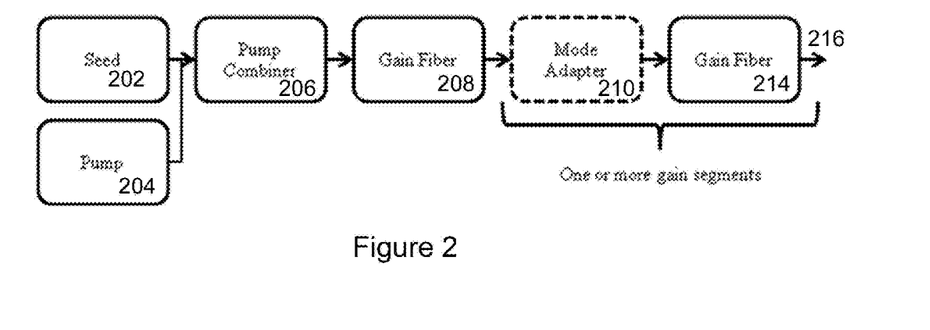
FIG. 2 is a block diagram illustrating an embodiment of an amplifier according to the present invention.

FIG. 2 is a block diagram illustrating an embodiment 200 of an amplifier according to the present invention. The amplifier system begins with a seed pulse train 202 with the pulses having a pulse duration in excess of 1 ps. In the preferred embodiment, this oscillator is tuned to produce a pulse appropriate for amplification, having a typical spectral width of 8 nm near 1040 nm wavelength, emerging from the model-locked oscillator with a spectral phase "chirp" sufficient to stretch the pulse to 10 ps duration. The bat ears shaped pulse produced by an ANDi laser is ideal (see FIG. 1D).

Alternative to directly adjusting the modelocked laser operating parameters to obtain the optimum pulse, a conventional pulse may optionally be shaped in other ways, as shown in FIG. 3.

The pulse train 202 is then directed into one or more fiber amplifiers via a pump combiner 206 that combines pump light 204 and seed light 202 into a passive (non-doped) fiber (not shown), or into the first gain fiber 208.

First gain fiber 208 is doped with rare earth ions with one core size and doping level, with the seed amplified by a factor of 10-1000, and the majority of the pump light being transmitted. The first gain fiber can include single mode (SM) fiber, large mode area (LMA) fiber, or photonic crystal fiber (PCF), and can be single or double clad.

Second gain fiber 214 has a second core size and doping level, where both the seed and the pump light from the first gain fiber are coupled in sequence into the second fiber, can also be added. Additional gain in the second gain fiber is from 10-1000. The second gain fiber can include single mode (SM) fiber, large mode area (LMA) fiber or photonic crystal fiber (PCF), including rod type fibers, and can be single or double clad. Mode adapter 210 is optional.

Figure 3A:
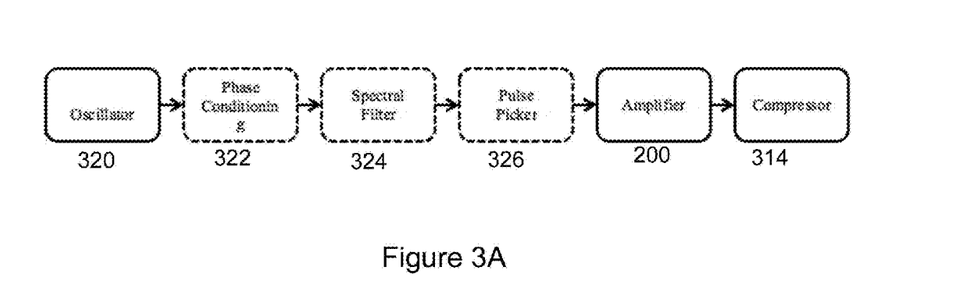
FIGS. 3A and 3B are block diagrams illustrating use of the amplifier of FIG. 2 with oscillator seed pulse generators.

Seed source 202 may comprise an oscillator configured to produce appropriate shaped seed pulses directly. FIG. 3A is a schematic diagram illustrating a system in which pulses from a conventional oscillator 320 are propagated through a phase conditioning step 322, which could consist of an optical fiber, grating pair, or other dispersive element to control the phase and achieve the desired phase. The pulses can then optionally be directed to a spectral filter 324, which can narrow the bandwidth if the oscillator is set to produce a bandwidth that is larger than the optimal width. Given the highly chirped nature of the pulses, this spectral narrowing causes some change to the temporal duration of the pulse. For this reason, it is sometimes desirable to spectrally filter in advance of any phase conditioning or stretching. The prepared pulse can then optionally be directed to a pulse picker 326 that selectively passes only some of the pulses from the modelocked laser 320 to amplifier 200, reducing the repetition rate of the resulting source laser output. Compressor 314 then generates compressed output pulses 316.

Figure 3B:
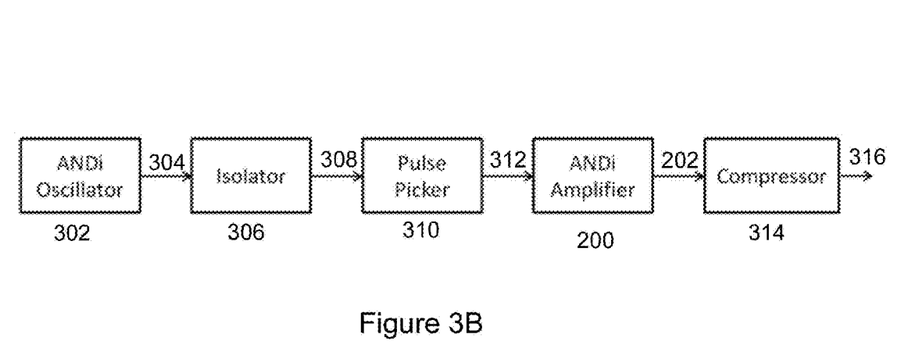

FIG. 3B is a block diagram illustrating use of the amplifier of FIG. 2 with an ANDi oscillator seed pulse generator 302. ANDi oscillator 302 provides a continuous train of chirped pulses 304 with spectral bandwidth >~10 nm to isolator 306. Isolator 306 prevents feedback from the amplifier chain back to the oscillator. The pulses 308 then pass through a pulse picker 310. Pulse picker 310 can optionally be used to pass ("pick") some of the pulses while blocking others from the oscillator, effectively reducing the repetition rate of pulses 312 passing into amplifier 200 (see FIG. 2), which generates output pulses 202. Compressor 314 then generates compressed output pulses 316.

Figure 4:
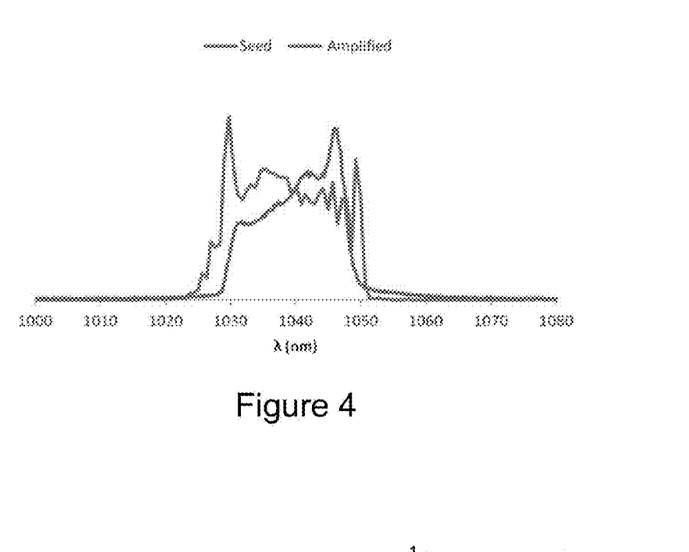
FIG. 4 is a plot showing the spectrum of the seed pulse and the output pulse of the system of FIG. 3.

FIG. 4 is a plot showing the spectrum of the seed pulse (narrow) and the output pulse (broad) of the system of FIG. 3. The seed pulse is generated from an ANDi oscillator tuned to produce pulses of width appropriate for amplification in this regime. The pulses are coupled into a 10 m long section of fiber which serves to shape the phase such that the pulses compress well using a grating compressor after amplification. The pulses are then directed into a pulse picker to reduce the pulse train repetition rate from approximately 60 MHz to 1 MHz. The output of the pulse picker is then directed into a pump combiner where the signal pulse train is injected into the core of double clad fiber and the 976 nm pump light is directed into the cladding of the fiber. This passive double clad fiber is spliced to a matching active fiber of 10 um core and 125 um cladding. The Yb doping level is a few %. The length of this pump fiber is 13 cm. This active fiber is then spliced to a short length of passive double clad fiber of the same dimensions as the active fiber. This fiber is then spliced to a larger mode area double clad photonic crystal fiber, with a 230 um cladding diameter and 40 um core diameter.

Figure 5:
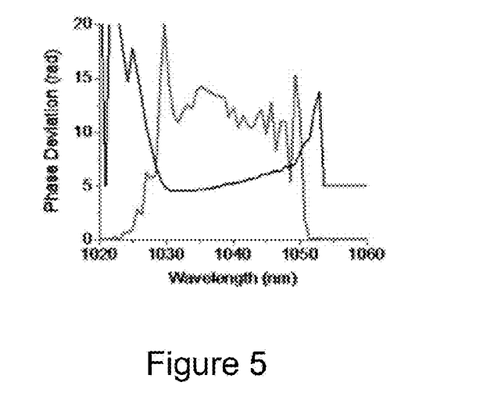
FIG. 5 is a plot of the spectral phase of the output pulse of FIG. 4.

FIG. 5 is a plot of the spectral phase of the output pulse of FIG. 4.

Figure 6:
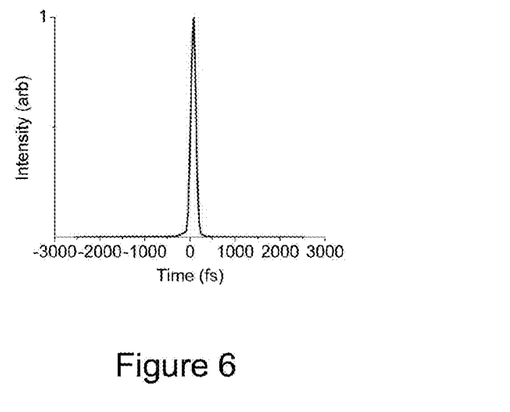
FIG. 6 is a plot of the temporal intensity of the output pulse of FIG. 4.

FIG. 6 is a plot of the temporal intensity of the output pulse of FIG. 4.

Figure 7A:
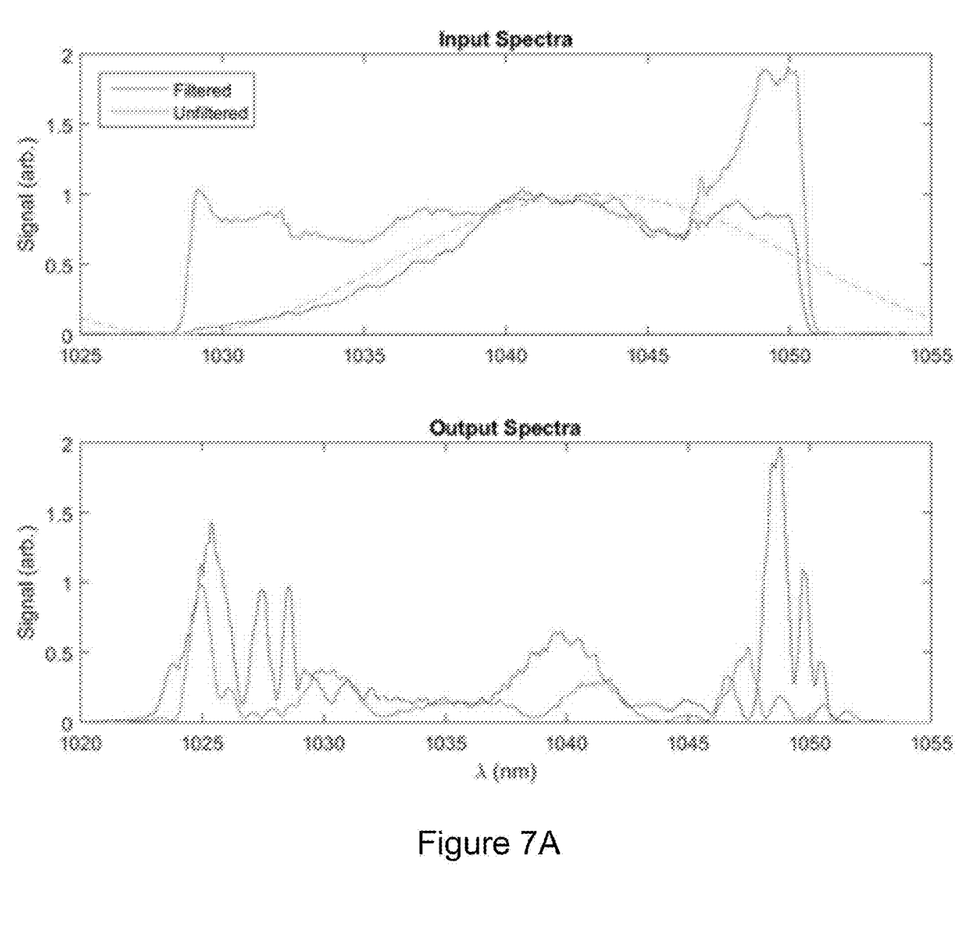
FIG. 7A is a plot illustrating a second embodiment of the present invention with an 8 nm wide bandpass filter.
Figure 7B:
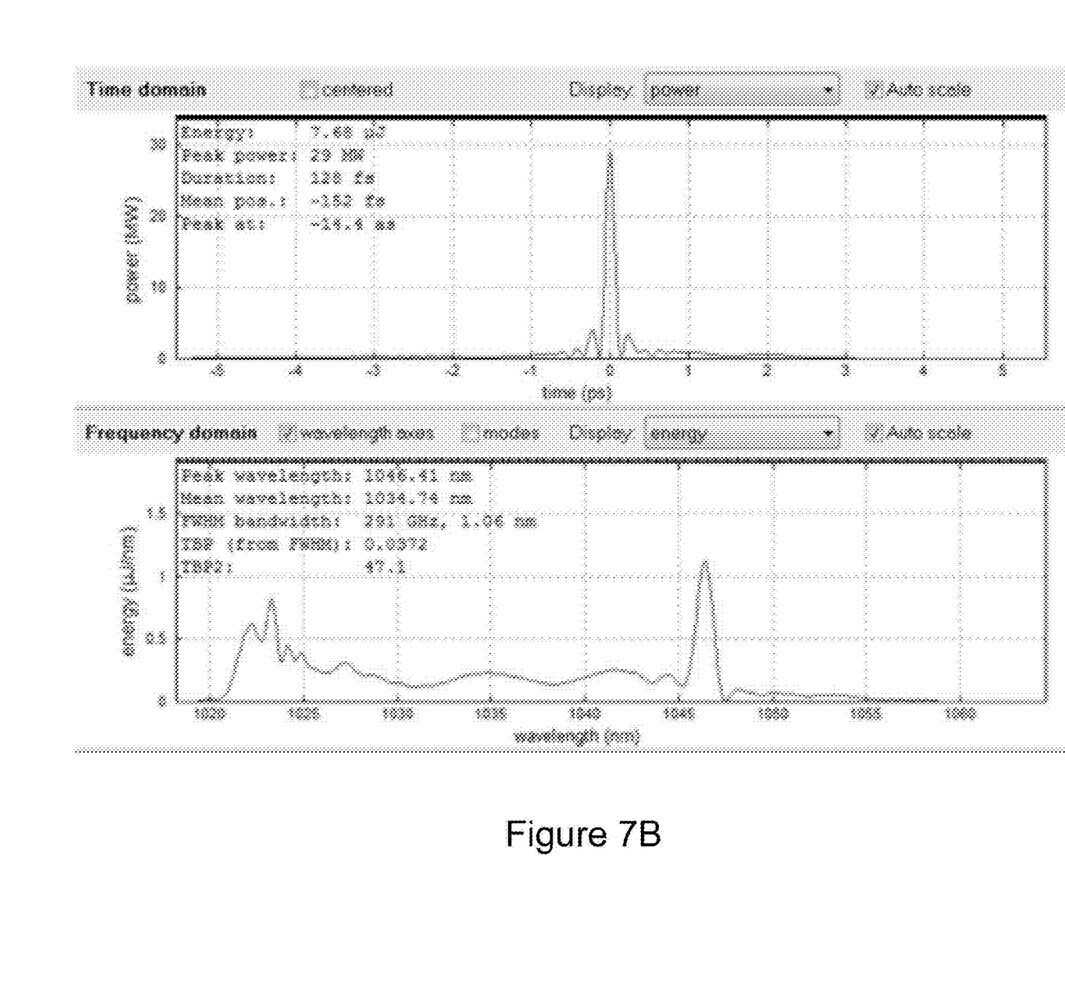
FIG. 7B is a simulated result using the same parameters as the experimental result of 7A.

FIG. 7A illustrates a second embodiment of the present invention with an 8 nm wide bandpass filter. In this embodiment, the dissipative soliton pulse is spectrally filtered before amplification. The spectrum directly from the oscillator is shown, as is the filtered spectrum at the output of the birefringent spectral filter. The dashed line shows the calculated transmission function of the spectral filter. The spectrally filtered pulse is directed into the pulse picker described above. The pulse then propagates through the pump combiner described above, and further through the 2 stage fiber amplifier as described above. The pump power is set to 30 W and the output power of the resulting pulse train is 10 W. The output spectrum is as given in the bottom panel of FIG. 7A. The two curves again correspond to the output spectrum of the amplifier seeded by filtered and unfiltered input spectra. While the characteristic "bat-eared" spectral shape is shown in both cases, the pulse background was reduced by the inclusion of the spectral filter at the input. This output spectrum agrees well with the simulated result created using the same parameters as described in the experiment. This simulated output spectrum is shown in the second panel of FIG. 7B. The top panel shows the temporal pulse out of the amplifier after it has been compressed using 1000/mm ruled gratings with ~5 cm separation.

Figure 8:
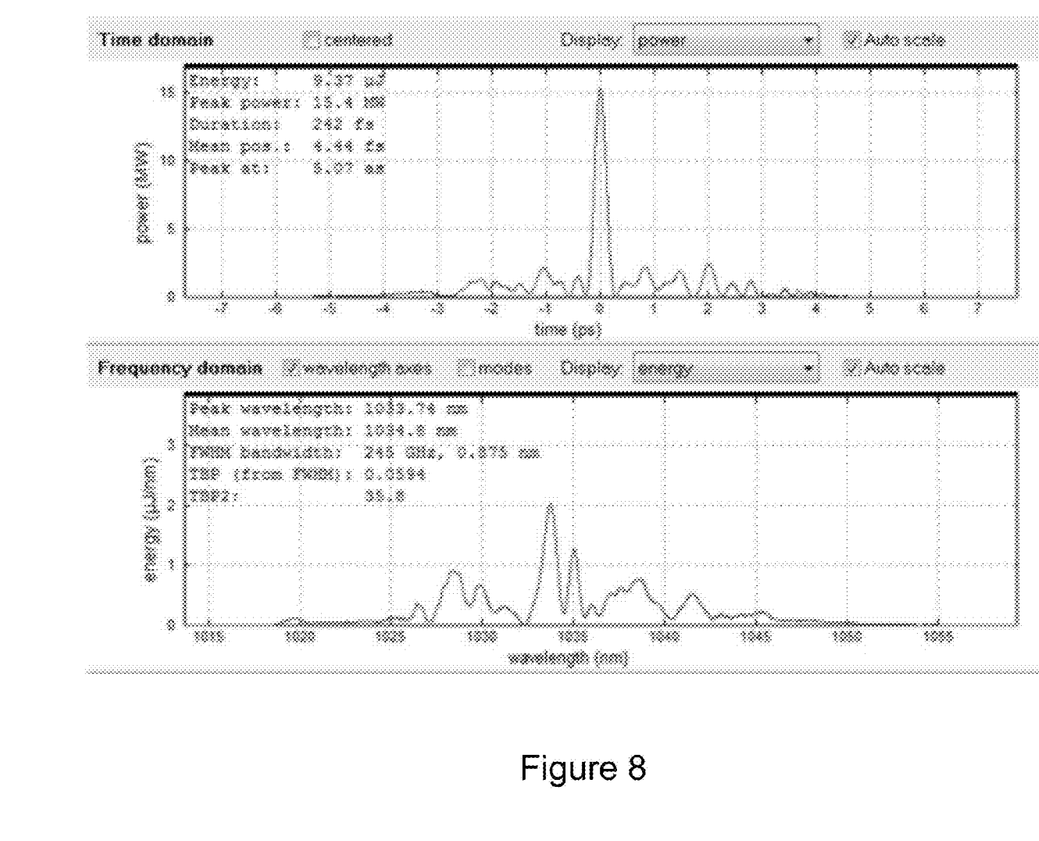
FIG. 8 is a simulated result of propagation through the system of FIG. 3B using a Gaussian pulse in place of the prepared dissipative soliton pulse.

FIG. 8 is a simulated result of propagation through the system of FIG. 3B using a Gaussian pulse in place of the prepared dissipative soliton pulse.

While the exemplary preferred embodiments of the present invention are described herein with particularity, those skilled in the art will appreciate various changes, additions, and applications other than those specifically mentioned, which are within the spirit of this invention. For example, a birefringent filter spectral filter has been used in this embodiment, but other methods of filtering could be used to produce pulses appropriate for amplification. In an example embodiment, an optical fiber is used to apply appropriate phase, but any dispersive element, for example a diffraction grating stretcher or volume or fiber bragg grating, could be used. The source used here is a dissipative soliton laser, while any laser producing chirped pulses possessing at least the desired bandwidth could be used in an alternate embodiment. Furthermore, the pump light could be introduced into the fiber amplifier in either the co-propagating or the counter-propagating direction. An important characteristic is that the spectrum maintains a dissipative-soliton type character that allows for compression of the pulse to short duration.

What is claimed is:

1. A single pass fiber amplifier system for generation of high-energy, ultrafast laser pulses comprising:
    means for providing a seed pulse train including seed pulses substantially having a characteristic spectral shape and phase of dissipative soliton pulses and wherein the seed pulses are between 1-20 ps duration;
    a pump source for providing pump light;
    a first gain fiber doped with rare earth ions for amplifying input light to produce amplified pulses;
    a pump combiner configured to combine the pump light and the seed pulses to form input light, the pump combiner including an input fiber for providing the input light to the gain fiber; and
    a compressor for compressing the amplified pulses to produce high-energy, ultrafast output pulses;
    wherein a stretcher is not used between the seed pulse train providing means and the gain fiber.

2. The amplifier system of claim 1 further comprising a spectral bandpass filter configured between the seed laser source and the gain fiber.

3. The amplifier system of claim 2 wherein the bandpass filter has a width of around 8 nm centered near 1040 nm wavelength.

4. The amplifier system of claim 1 wherein the pump light is at around 976 nm.

5. The amplifier of claim 4 wherein the pump light is at least about 30 W, and wherein the output pulses are at least about 10 W.

6. The amplifier system of claim 1 further comprising a second gain segment connected to the first gain segment.

7. The amplifier system of claim 6 further comprising a mode adapter configured between the first and the second gain segments.

8. The amplifier system of claim 6 wherein the pump source provides light to the first gain segment and the second gain segment.

9. The amplifier system of claim 6 wherein the first gain fiber and the second gain fiber comprise one or more of the following:
    single mode (SM) fiber;
    large mode area (LMA) fiber;
    photonic crystal fiber (PCF);
    single clad;
    double clad.

10. The amplifier system of claim 1 further comprising a mode adapter configured between the first gain fiber and the pump combiner.

11. The amplifier system of claim 1 wherein the first gain fiber comprises one or more of the following:
    single mode (SM) fiber;
    large mode area (LMA) fiber;
    photonic crystal fiber (PCF);
    single clad;
    double clad.

12. The amplifier system of claim 1 wherein the means for providing a seed pulse train comprises an ANDi oscillator.

13. The amplifier system of claim 1 wherein the gain fiber is a double clad fiber and wherein the pump combiner is configured to inject the seed pulse train into a gain fiber core and the pump light into the cladding of the fiber.

14. The amplifier system of claim 1 wherein the output pulses after the compressor are between about 50-200 fs duration.

15. A single pass fiber amplifier system for generation of high-energy, ultrafast laser pulses comprising:
    an ANDi laser for providing a seed pulse train including seed pulses substantially having a characteristic spectral shape and phase of dissipative soliton pulses and wherein the seed pulses are between 1-20 ps duration;
    a pump source for providing pump light power of at least about 30 W;
    a first gain fiber doped with rare earth ions for amplifying input light to produce amplified pulses;
    a pump combiner configured to combine the pump light and the seed pulses to form input light, the pump combiner including an input fiber for providing the input light to the gain fiber; and
    a compressor for compressing the amplified pulses to produce a high-energy, ultrafast output pulse train power of at least about 10 W; and
    wherein a stretcher is not used between the ANDi laser and the gain fiber.

16. The amplifier system of claim 15 further comprising a second gain segment connected to the first gain segment and a mode adapter configured between the first and the second gain segments.

17. The amplifier system of claim 16 wherein the pump source provides light to the first gain segment and the second gain segment.

18. The amplifier system of claim 16 wherein the first gain fiber and the second gain fiber comprise one or more of the following:
    single mode (SM) fiber;
    large mode area (LMA) fiber;
    photonic crystal fiber (PCF);
    single clad;
    double clad.

19. The amplifier system of claim 15 wherein the first gain fiber comprises one or more of the following:
  single mode (SM) fiber;
  large mode area (LMA) fiber;
  photonic crystal fiber (PCF);
  single clad;
  double clad.

20. The amplifier system of claim 15 wherein the output pulses after the compressor are between about 50-200 fs duration.

* * * * *